March 20, 1945.  R. W. ESAREY  2,372,064
CENTRIFUGAL DEVICE
Filed Oct. 28, 1942
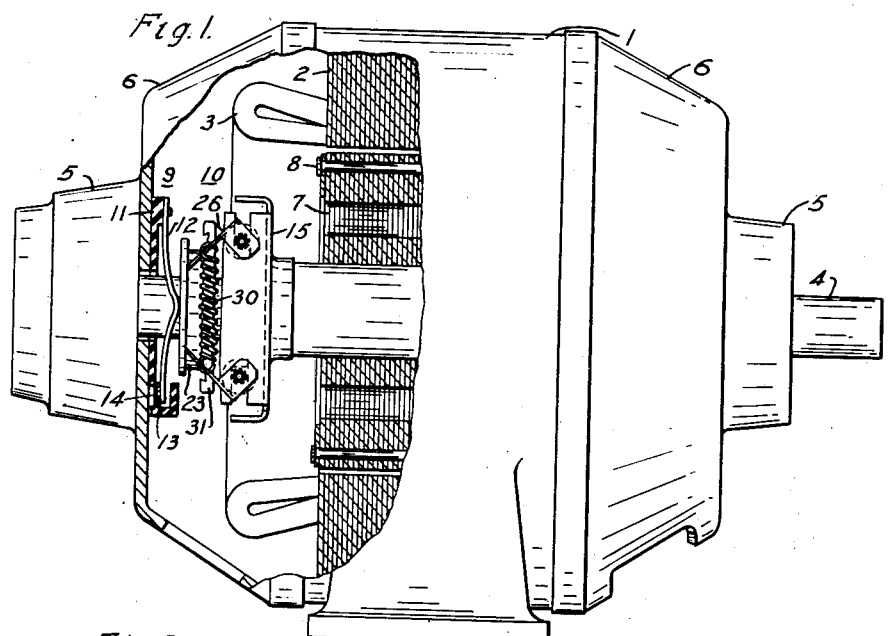
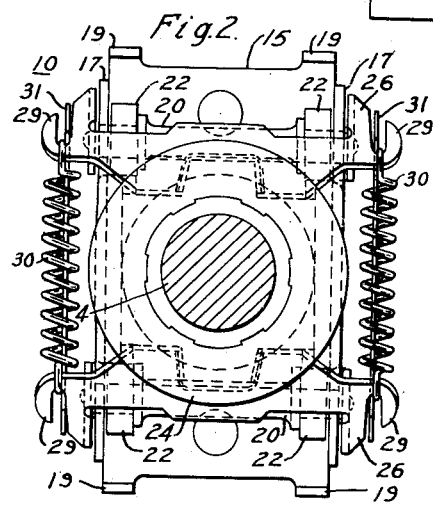
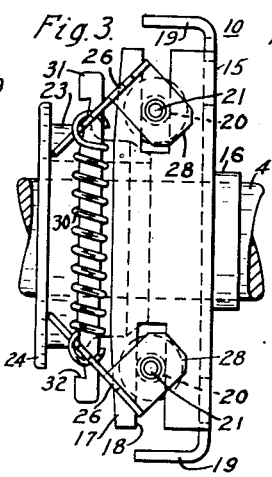
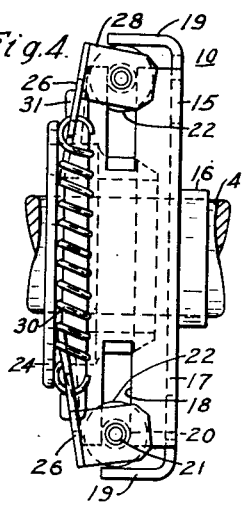
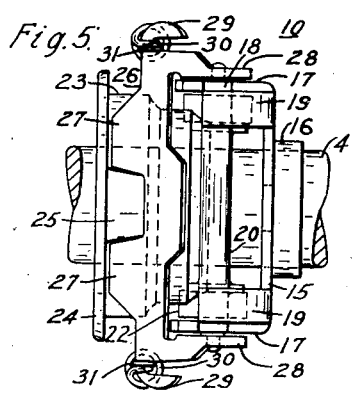
WITNESSES:
INVENTOR
Raymond W. Esarey.
BY
ATTORNEY Patented Mar. 20, 1945

2,372,064

UNITED STATES PATENT OFFICE 2,372,064

CENTRIFUGAL DEVICE

Raymond W. Esarey, Lima, Ohio, assignor to Westinghouse Electric & Manufacturing Company, East Pittsburgh, Pa., a corporation of Pennsylvania Application October 28, 1942, Serial No. 463,633

3 Claims. (Cl. 264—17)

The present invention relates to centrifugal devices and, more particularly, to a rotor member for a centrifugally-actuated speed-responsive switch, such as is used in single-phase electric motors.

Single-phase motors usually have a main primary winding and an auxiliary or starting primary winding. The circuit of the auxiliary winding is controlled by a speed-responsive switch which operates when the motor has reached a predetermined speed to disconnect the auxiliary winding, or, in some types of motors, to effect a change in the connections of the auxiliary winding for running.

In some applications of single-phase motors, such as in hoists, it sometimes happens through inadvertence, failure of a mechanical brake, or otherwise, that the motor is driven by the load at a very much higher speed than the speed at which it normally runs. When this occurs, the centrifugal force acting on the rotating part of the speed-responsive switch is very much higher than the force for which the switch is designed, and centrifugal devices of conventional construction usually fly apart under these conditions, resulting in destruction of the switch, and usually in damage to the windings of the motor. This type of failure of the switch is chiefly due to the fact that the excessive centrifugal force stretches the springs of the centrifugal device beyond their elastic limit, thus causing a permanent deformation of the springs and permitting them to release the weights and other parts of the device so that it flies apart.

The principal object of the present invention is to provide a centrifugal device which can safely be driven at very much higher speeds than the speed at which it is normally intended to run, and which will not be damaged by running at such speeds.

Another object of the invention is to provide a centrifugal device in which means are provided to positively limit the outward movement of the movable parts, and to prevent tensioning of the springs beyond their elastic limit.

A further object of the invention is to provide a simple and inexpensive means which can easily be applied to centrifugal devices of standard design to limit the outward movement of the movable parts, and to prevent tensioning of the springs beyond their elastic limit, even when the device is driven at very much higher speeds than it is intended for.

Further objects and advantages of the invention will be apparent from the following detailed description, taken in connection with the accompanying drawing, in which:

Figure 1 is a side view, partly in section, of an electric motor, showing the application of the centrifugal device of the present invention;

Fig. 2 is an end view of the centrifugal device of Fig. 1 on a larger scale;

Fig. 3 is a side view of the centrifugal device;

Fig. 4 is a view similar to Fig. 3 but showing the parts of the centrifugal device in their positions when the motor is running at normal speed; and Fig. 5 is a top plan view of the centrifugal device.

Fig. 1 shows a centrifugal device embodying the present invention as used in the starting switch of a relatively small single-phase motor. The motor shown in the drawing is of typical construction, and has a frame member 1 in which is supported a laminated stator core 2 which carries suitable main and auxiliary stator windings, generally indicated at 3, in slots in its inner periphery. The motor has a shaft 4 which is supported for rotation in suitable bearings 5 mounted in the end brackets 6. A laminated rotor core 7 is secured to the shaft and suitable rotor windings 8 are carried on the rotor core 7.

The starting switch, which is mounted inside one of the end brackets, consists of a stationary member 9 and a rotor member or centrifugal device 10. The stationary member 9 may be of any suitable type, and is shown as consisting of a support or base 11 of insulating material, which is rigidly fastened in the inside of the end bracket 6 in a position surrounding, but spaced from, the shaft 4. A spring member 12 is secured to the base 11 at one end, and at its other end carries a contact 13 which is adapted to engage an opposing contact 14 on the base 11. The spring member 12 normally holds its contact 13 away from the contact 14, but it is positioned so as to be engaged by the centrifugal device 10, which holds the contacts 13 and 14 together when the motor is at standstill, or running at low speed. The contacts 13 and 14 are, of course, connected in the circuit of the auxiliary winding of the motor in any usual manner.

The centrifugal device 10, to which the present invention particularly relates, is shown in detail in Figs. 2 to 5 of the drawing. The centrifugal device, or rotor member, includes a support or body member 15, which may be formed of sheet metal. The support member 15 is generally rectangular, and it has a central annular flange 16 by means of which it is rigidly mounted on the shaft 4 so as to rotate with it. The support member 15 also has side portions 17 which are bent at right angles to the plane of the support member so as to extend parallel to the shaft, and each of the side portions 17 has slots 18 cut in both ends thereof extending substantially perpendicular to the axis of the shaft. The support member 15 also has end portions 19 at each end bent over parallel to the shaft to limit the outward movement of the movable weights, as explained below.

A pair of movable weights 20 is mounted on the support member 15. The weights 20 are positioned on opposite sides of the shaft 4, and each weight has pintles 21 at both ends which extend through the slots 18 and engage the slots to guide the weights 20 in their inward and outward movement, so that they move radially toward and away from the shaft. Each of the weights 20 also has a roller 22 of a rather hard, resilient material mounted on the pintle 21 at each end. The rollers 22 are adapted to engage the end portions 19 of the support 15 when the weights 20 move radially outward to limit the outward movement of the weights, and the rollers 22 absorb any shock or jar when the weights are stopped so as to attain substantially quiet operation of the switch.

The centrifugal device 10 also includes a slider member 23 which is adapted to move axially of the shaft 4. The slider 23 has a radial flange 24 which engages the spring member 12 when the slider is in its extreme left-hand position, as seen in the drawing, to hold the contacts of the switch closed. The slider is of generally cylindrical shape, and is connected to the weights 20 by means of a pair of opposed finger plates 26 which function as connecting members or links to connect the slider 23 to the weights 20, so that the slider is moved axially when the weights 20 move inwardly or outwardly with respect to the shaft. The finger plates 26 are positioned on opposite sides of the shaft, and each of the finger plates has two extending finger portions 27 which engage in notches 25 in the periphery of the slider 23. Each finger plate 26 also has downwardly bent portions 28 at its opposite end which are attached to the pintles 21 of the weights 20 on the outside of the side portions 17 of the support member 15, so that movement of the weights 20 radially of the shaft also moves the finger plates, and thus causes them to move the slider. The finger plates also have lugs 29 at each side, and the two finger plates on opposite sides of the shaft are connected together by means of helical tension springs 30 which are attached to the lugs 29 to draw the finger plates together towards the shaft. The springs 30 thus tend to hold the weights 20 in their innermost position, with the slider 23 moved to the left, so as to engage the stationary part 9 of the switch and maintain the contacts 13 and 14 closed, as shown in Fig. 1.

When the motor starts up, the centrifugal device 10 rotates with the shaft, and the centrifugal force acting on the weights 20 tends to move them radially outward, but this movement is opposed by the tension springs 30, acting through the finger plates 26, so that the weights are held in their innermost position. As the motor speeds up, the centrifugal force increases, and when a predetermined speed is reached, the centrifugal force becomes great enough to overcome the opposing force of the springs 30, and the weights 20 move radially outward, being guided by the slots 18, until the rollers 22 engage the end portions 19 of the support 15. This outward movement of the weights draws the slider 23 axially to the right, by means of the finger plates 26, so that the contacts 13 and 14 are disengaged by the spring 12. In the particular structure shown in the drawing and described above, the arrangement of the springs 30 is such that the force exerted by the springs on the weights 20 decreases as the weights move outward, for the reason that as the weights move away from the shaft, the line of action of the springs becomes more nearly parallel to the plane joining the fingers 27 and the points of attachment of the portions 28 to the pintles 21 of the weights. This arrangement has the advantage of insuring reliable and steady operation of the switch, and also has the further advantage that the switch does not return to its low-speed position until the speed of the motor has decreased to a speed considerably less than that at which the switch operated, which is especially desirable for certain types of motors.

When the centrifugal device described herein, or any centrifugal device utilizing a similar type of construction, is subjected to much higher forces than those for which it is designed, such as by driving the shaft on which it is mounted at a much higher speed than that for which the centrifugal device is intended, failure of the device is likely to result. This is because the large, radially directed centrifugal force applied to the finger members 26 and the springs 30 stretches the springs and tensions them beyond their elastic limit, so that a permanent stretching or deformation of the springs occurs. Such stretching of the springs releases the finger plates 26, so that they are thrown outwardly by the centrifugal force, pivoting around the pintles 21 of the weights. When this occurs, the entire structure flies apart and the switch is destroyed. Damage to the motor windings is very often also caused by the parts of the switch, which are thrown away from the shaft with great force.

In accordance with the present invention, such failures are prevented by providing means for positively limiting the outward movement of the finger plates, and for limiting the tension that can be applied to the springs by the centrifugal force. This is accomplished by the provision of a pair of stop members 31, one of which is placed in each of the springs 30. The stop members 31 preferably consist of thin strips of material of relatively high elastic limit, such as phosphor-bronze, although any suitable material having a higher elastic limit than that of the springs may be used. Each of the stop members 31 is shaped to provide a hook portion 32 at each end, and each stop member is positioned within the spring with which it is associated, the width of the stop member being made such that it is held in position by frictional engagement with the convolutions of the spring.

When the centrifugal device is at rest, or rotating at low speed, as shown in Fig. 3, the ends of the stop members 31 project beyond the finger plates and the ends of the springs, and when the device starts to accelerate, the weights 20 move outwardly and move the slider 23 axially, in the manner described above, so that the stops 31 have no effect on the normal operation of the device. When the weights 20 reach their extreme position, as shown in Fig. 4, the finger plates 26 have been moved to the position shown, in which the lugs 29 are engaged by the hook portions 32 of the stop members 31. Since each of the stops is a single continuous strip of material of high tensile strength, and the two finger plates on opposite sides of the shaft are engaged by both ends of each of the two stop members 31, the finger plates are positively held against further outward movement. Since the springs 30 are attached to the lugs 29, they are also positively restrained, and cannot be tensioned beyond the loading for which they were designed, no matter how fast the shaft may be rotated. Thus, the provision of the stop members 31 makes the centrifugal device safe irrespective of the speed at which it is rotated, since it is impossible for the parts of the device to fly apart, or for the springs to be tensioned beyond their elastic limit.

The stop members 31 are very simple, and are inexpensive to make, since they can be die-cut from strip or sheet material, and they can easily be applied to existing centrifugal devices without requiring any changes whatever in the design of the devices. Thus, the present invention is very advantageous, since standard centrifugal starting switches, such as are commonly used on single-phase motors, can easily and cheaply be made safe against the effects of excessive speed when the application for which the motor is intended makes such precautions advisable. It is to be understood that the usefulness of the invention is not restricted to the particular centrifugal device illustrated and described above, since it is apparent that the stop members 31, or their equivalent, could readily be applied to any centrifugal device of the same general type.

Although a specific embodiment of the invention has been illustrated and described, it is to be understood that the invention is not limited to the exact arrangement shown, but that in its broadest aspects it includes all equivalent embodiments and modifications which come within the scope of the appended claims.

I claim as my invention:

1. In a centrifugal device, a rotor member comprising a support member adapted to be fixed on a shaft to rotate therewith, a pair of opposed weight members mounted in said support member on opposite sides of the shaft and guided for movement toward and away from the shaft, a slider mounted for movement axially of the shaft, a pair of opposed connecting members, each connecting member being attached to one of said weights and having a portion engaging said slider to effect axial movement of the slider when the weight members move toward or away from the shaft, a pair of helical tension springs extending between said connecting members on opposite sides of the shaft, said springs tending to draw said connecting members together toward the shaft, and a stop member supported by each of said springs, each stop member being held in position by frictional engagement with the convolutions of its spring, and each stop member being shaped at both ends to engage the connecting members at a predetermined point in their outward movement to prevent further outward movement.

2. In a centrifugal device, a rotor member comprising a support member adapted to be fixed on a shaft to rotate therewith, a pair of opposed weight members mounted in said support member on opposite sides of the shaft and guided for movement toward and away from the shaft, a slider mounted for movement axially of the shaft, a pair of opposed connecting members, each connecting member being attached to one of said weights and having a portion engaging said slider to effect axial movement of the slider when the weight members move toward or away from the shaft, a pair of helical tension springs, said springs being disposed on opposite sides of the shaft, one end of each spring engaging one of said connecting members and the other end of each spring engaging the other connecting member, whereby the springs tend to draw the connecting members together toward the shaft, and an elongated member extending longitudinally of each of said springs, each of said elongated members being supported substantially coaxially of the spring and extending beyond the spring at both ends, said elongated members being shaped at each end to engage the connecting members at a predetermined point in their outward movement to prevent further outward movement and further tensioning of the springs.

3. The invention as defined in claim 2 characterized by the elongated members being made of a material having a higher elastic limit than that of the springs.

RAYMOND W. ESAREY.